United States Patent [19]
Endo

[11] Patent Number: 5,936,610
[45] Date of Patent: *Aug. 10, 1999

[54] CONTROL DEVICE FOR IMAGE INPUT APPARATUS

[75] Inventor: Shozo Endo, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/880,561

[22] Filed: Jun. 23, 1997

Related U.S. Application Data

[63] Continuation of application No. 08/278,756, Jul. 22, 1994, abandoned.

[30] Foreign Application Priority Data

Jul. 27, 1993 [JP] Japan ................................ 5-185364

[51] Int. Cl.⁶ .................................................... G09G 5/00
[52] U.S. Cl. ............................................ 345/157; 345/342
[58] Field of Search .................................. 345/119, 120, 345/902, 342–346, 432–434, 156, 157, 158, 9; 395/153, 154

[56] References Cited

U.S. PATENT DOCUMENTS

| | | | |
|---|---|---|---|
| 4,988,981 | 1/1991 | Zimmerman et al. | 345/158 |
| 5,107,443 | 4/1992 | Smith et al. | 345/331 |
| 5,412,775 | 5/1995 | Maeda et al. | 345/345 |
| 5,481,297 | 1/1996 | Cash et al. | 348/13 |
| 5,528,744 | 6/1996 | Vaughton | 345/342 |
| 5,574,836 | 11/1996 | Broemmelsiek | 345/112 |
| 5,651,107 | 7/1997 | Frank et al. | 345/433 |
| 5,801,704 | 8/1995 | Oohara et al. | 345/157 |

FOREIGN PATENT DOCUMENTS

| | | | |
|---|---|---|---|
| 605945A1 | 12/1992 | European Pat. Off. | 345/119 |
| 3-186894 | 8/1991 | Japan | 345/120 |
| 6-51738 | 2/1994 | Japan | 345/119 |

*Primary Examiner*—Amare Mengistu
*Attorney, Agent, or Firm*—Robin, Blecker & Daley

[57] ABSTRACT

A control device for an image input apparatus such as a camera includes a display unit which displays image information obtained from the camera in an image display window, a controller arranged to permit control over a predetermined function of the camera through a control window displayed on the screen of the display unit and a controller arranged to allow, in response to a specific operation, the control window to appear in a position where an identifier is displayed on the screen. The device is further arranged to semitransparently display on the screen at least a part of the control window where the control window overlaps the image display window.

16 Claims, 8 Drawing Sheets

CONTROL DEVICE FOR IMAGE INPUT APPARATUS

This is a continuation application under 37 CFR 1.62 of prior application Ser. No. 08/278,756, filed Jul. 22, 1994, is now abandoned.

BACKGROUND OF THE INVENTION

1. Field of the Invention

This invention relates to a control device for controlling an image input apparatus such as a camera or the like and more particularly to a device for controlling an image input apparatus of an image communication terminal equipment such as a video conference system or a video telephone system and such as a remote surveillance device.

2. Description of the Related Art

FIG. 1 is a front view showing by way of example the arrangement of the conventional terminal equipment for a video conference. Referring to FIG. 1, a camera 111 is arranged on a display device 114 to pick up an image of a user 112. Many windows can be opened on the screen of the display device 114 by means of a known window display system. In the case of FIG. 1, a self-portrait window 116 in which the image of the user 112 picked up by the camera 111 is displayed is disposed in the middle of the screen. A camera control window 118 is disposed on one side of the self-portrait window 116. In the rear of the self-portrait window 116 is disposed another window 120 (showing a clock in this case).

A mouse 122 is provided for designating or inputting an instruction for a desired position on the screen of the display device 114. A cursor 123 is arranged to be displayed on the screen of the display device 114 in a manner corresponding to an operation performed on the mouse 122. Control elements are displayed in the control window 118. Turning on/off of a power supply, a panning or tilting movement to the right, left, upward or downward, a focal length, an exposure and zooming of the camera 111 can be controlled and adjusted by selecting and operating these control elements through the mouse 122. The terminal equipment includes a keyboard 124 and a microphone 126 for inputting voices.

The user 112 normally sits in front of the display device 114. When the mouse 122 or the keyboard 124 is operated to turn on the power supply of the camera 111, the self-portrait window 116 is set in the middle part of the screen of the display device 114. An image picked up by the camera 111 is then displayed in the self-portrait window 116 in a right/left inverted state. The display enables the user 112 to confirm the operating state of the camera 111 and how the user is imaged.

In the case of the conventional arrangement, the camera control window 118 is disposed where its presence is no obstacle to the self-portrait window 116. This arrangement, therefore, necessitates the user 112 to shift his or her visual line frequently to a large extent between a visual line 128a directed to the self-portrait window 116 and another visual line 128b directed to the camera control window 118 in adjusting the conditions of the camera 111.

This problem exists also in remotely operating another camera set at a corresponding terminal equipment while watching an image coming from an image communicating correspondent and appearing in an image receiving window. This problem is detrimental also to a remote operation on a surveillance camera or the like.

SUMMARY OF THE INVENTION

In view of the problem mentioned above, it is an object of the present invention to provide a control device which permits control over an image input apparatus without shifting a visual line (a line of sight) to a large extent while watching an image obtained from the image input apparatus.

It is another object of the invention to provide an image input apparatus control device which facilitates recognition of the state of a camera under control when at least two image windows and control windows corresponding to these image windows are displayed on a screen.

To attain these objects, a control device for an image input apparatus arranged according to the invention as one embodiment thereof includes display means for displaying, in an image window, image information obtained from the image input apparatus, first control means for permitting control over a predetermined function of the image input apparatus through a control window displayed on the screen of the display means, and second control means for allowing, in response to a specific operation, the control window to appear in a position where an identifier is displayed on the screen.

Further, to attain the objects, another control device for an image input apparatus arranged as another embodiment of the invention includes display means for displaying, in an image window, image information obtained from the image input apparatus, first control means for permitting control over a predetermined function of the image input apparatus through a control window displayed on the screen of the display means, and second control means for allowing, in response to a specific operation, the control window to appear in the image window.

A control device for an image input apparatus arranged as a further embodiment of the invention includes display means for displaying, in an image window, image information obtained from the image input apparatus, first control means for permitting control over a predetermined function of the image input apparatus through a control window displayed on the screen of the display means, and second control means for allowing, in response to a specific operation, the control window to appear approximately in a middle part of the screen of the display means.

A control device arranged as a further embodiment of the invention includes display means for displaying image information obtained from a plurality of image input apparatuses respectively in corresponding image windows, first control means for permitting control over a predetermined function of each of the image input apparatuses through a control window displayed on the screen of the display means, and second control means for allowing, in response to a specific operation, the control window to appear in a state corresponding to one of the image windows displayed in a position where an identifier is displayed on the screen of the display means.

A control device arranged as a still further embodiment of the invention includes display means for displaying image information obtained from a plurality of image input apparatuses respectively in corresponding image windows, first control means for permitting control over a predetermined function of each of the image input apparatuses through control windows displayed on the screen of the display means, and second control means for varying, when at least two image windows and control windows corresponding respectively to the two image windows are displayed on the screen, the transparency of each of the control windows.

These and other objects and features of the invention will become apparent from the following detailed description of

DETAILED DESCRIPTION OF THE PREFERRED EMBODIMENT

Figure 1:
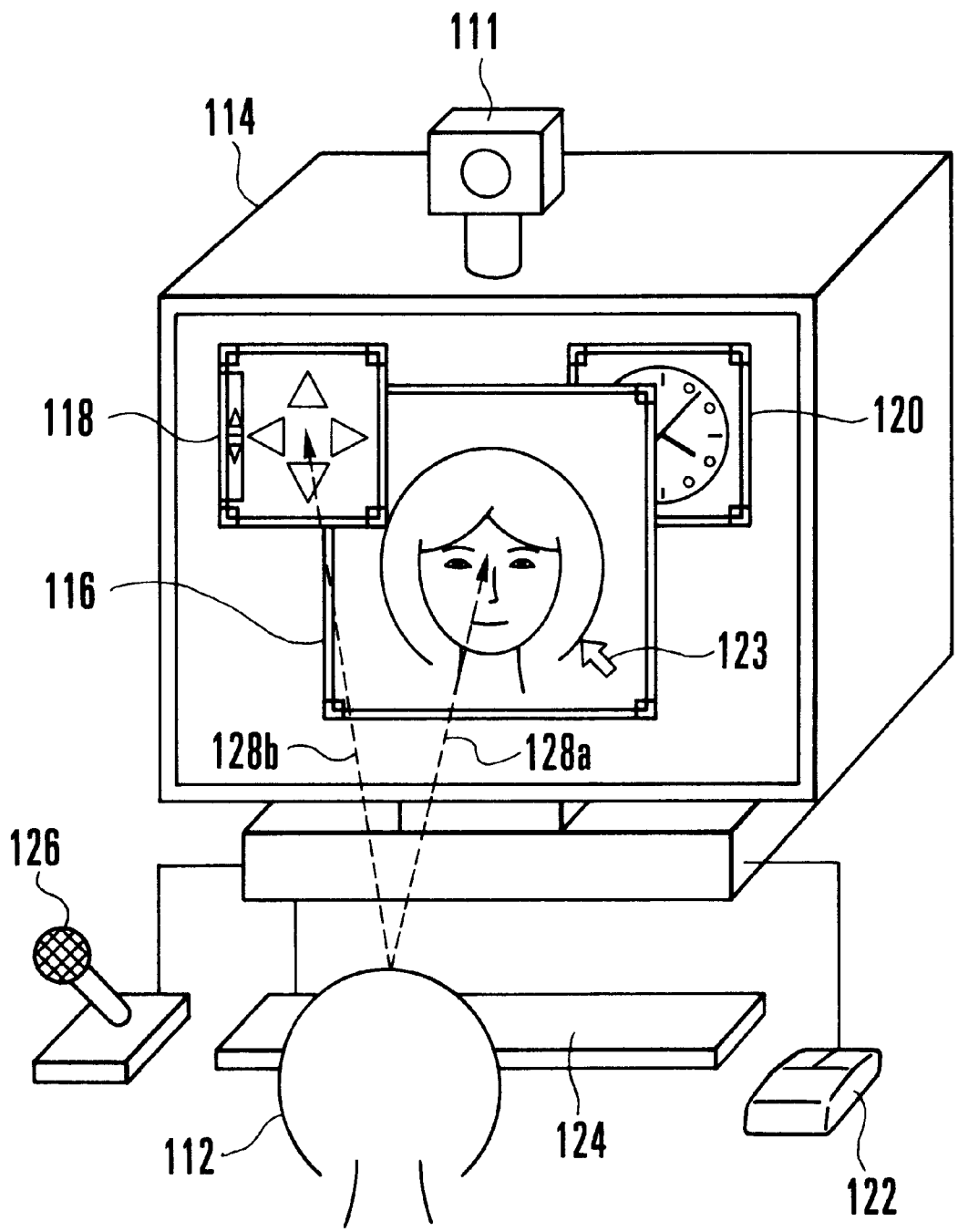
FIG. 1 is an oblique view showing the prior art.
Figure 2:
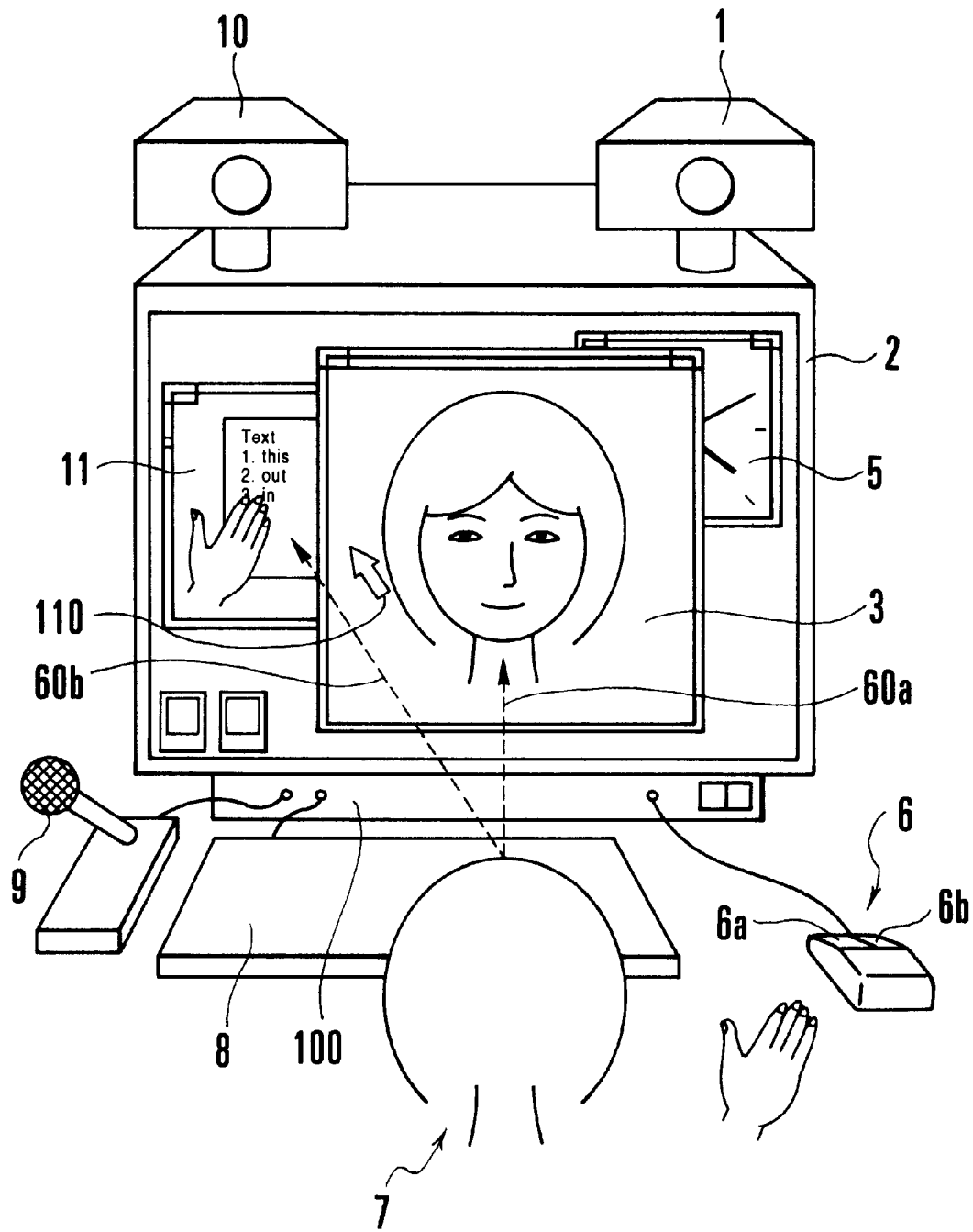
FIG. 2 is a front view showing in outline the system of an embodiment of the invention.

An embodiment of the invention is described in detail with reference to the drawings as follows. FIG. 2 is a front view showing the embodiment of the invention. Referring to FIG. 2, cameras 1 and 10 are arranged as image input apparatuses to pick up images of a user 7 and some other object of shooting. The images from these cameras 1 and 10 are inputted to a computer 100. In the case of the embodiment shown in FIG. 2, the cameras 1 and 10 are arranged on a display device 2. However, this arrangement may be changed to set the camera 1 on the display device 2 for shooting a person or persons and to use the other camera 10 for an electronic overhead projector (OHP) by arranging it on a manuscript stand (not shown) to read a manuscript or the like. The display device 2 is arranged to be capable of displaying information obtained from a plurality of information sources which are under the control of the computer 100.

Many windows can be opened by a known window display system on the screen of the display device 2. In the case of FIG. 2, an image display window (hereinafter referred to as display window) 3 for displaying an image inputted from the camera 1 is disposed in the middle of the screen of the display device 2. A display window 11 which is for displaying an image inputted from the other camera 10 and another window 5 (showing a clock in this particular instance) are disposed in the rear of the display window 3.

This system includes, among others, a mouse controller (hereinafter referred to as a mouse) 6 which is provided for designating or inputting an instruction for a desired position on the screen of the display device 2, a keyboard 8 for inputting information to the computer 100 and a microphone 9 for inputting audio information to the computer 100. A cursor 110 which serves as an identifier is arranged to be displayed on the screen of the display device 2 in a position designated by the mouse 6.

In using this system, the user 7 normally sits in front of the display device 2. When the power supply of the camera 1 is turned on by means of the mouse 6, the keyboard 8 or the like, the display window 3 is set in the middle of the screen of the display device 2. An image picked up by the camera 1 is displayed in the display window 3 in a right/left inverted state. This display enables the user 7 to know the operating state of the camera 1 and also how his or her image is displayed. In this instance, with the camera 1 facing the user 7, the display window 3 enables the user to confirm the image obtained from the camera 1 as if it is a mirror.

Figure 3:
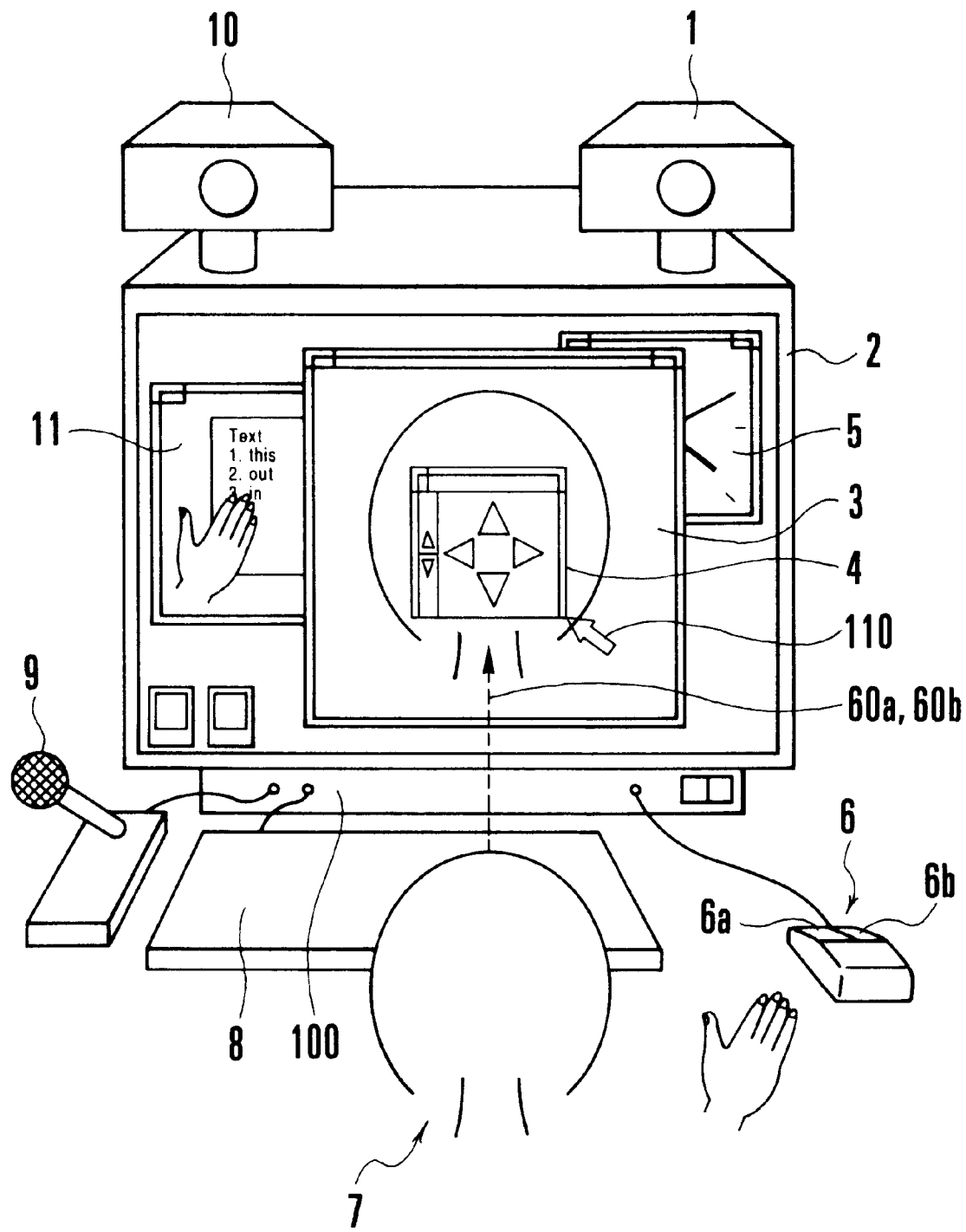
FIG. 3 is a front view showing the embodiment shown in FIG. 2 in a state in which a control window is opened on the screen of a display device.
Figure 4:
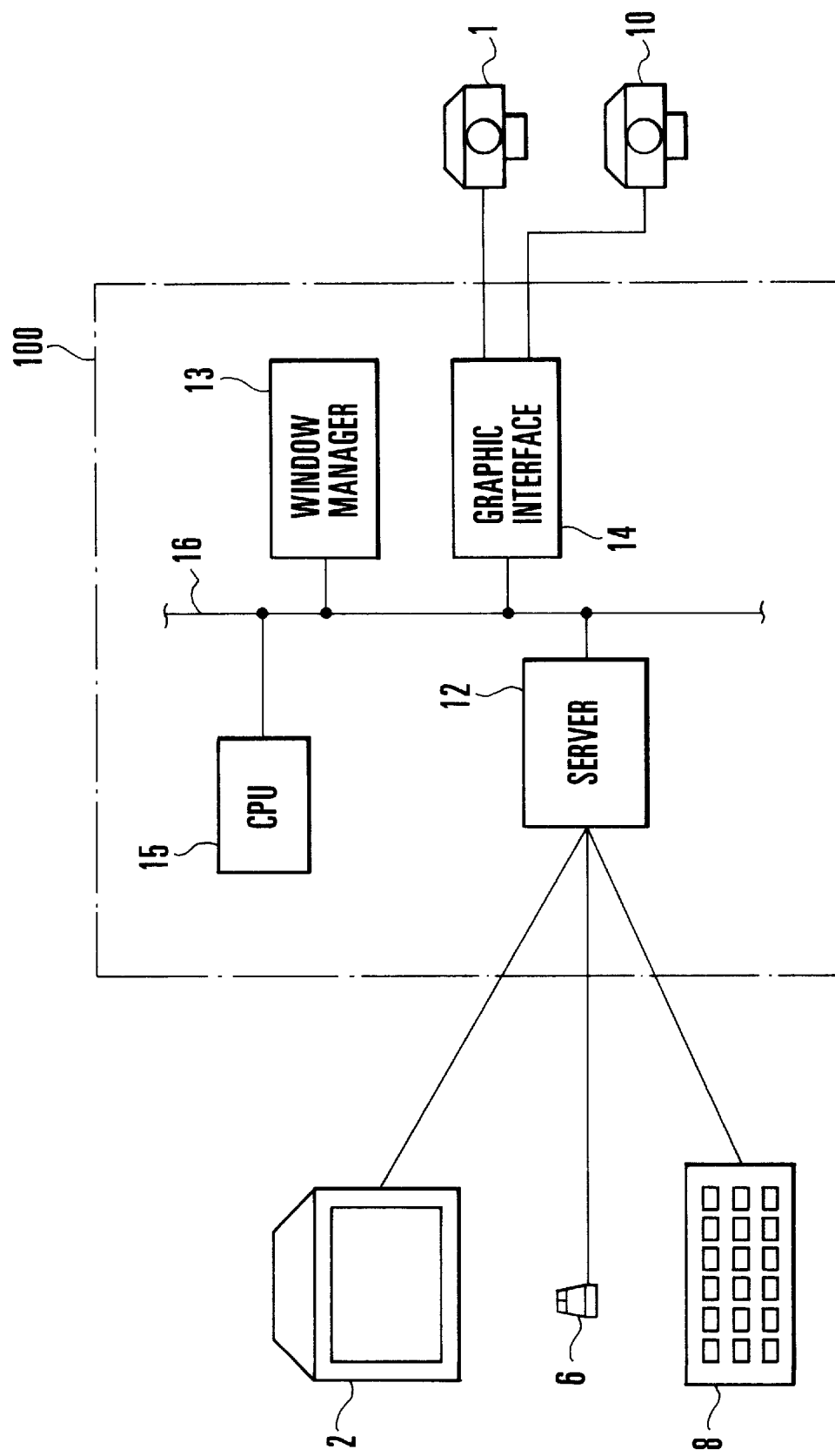
FIG. 4 is a block diagram showing in outline the arrangement of the embodiment shown in FIG. 2.

In this case, with the user 7 supposed to be an object of shooting, the camera 1 must be directed to the user 7 if the user 7 is not completely covered by the camera 1. In such a case, the user 7 pushes a predetermined button 6a provided on the mouse 6. Then, as shown in FIG. 3, a camera controlling window (hereinafter referred to as a control window) 4 for controlling a panning/tilting movement, a focal length, an exposure, zooming, etc., of the camera 1 is displayed in the display position of the cursor 110. The user 7 can control the above-stated various actions of the camera 1 by pushing the button 6a to adjust the cursor 110 to a desired position of the control window 4. The control over these actions are carried out by a central processing unit (hereinafter referred to as a CPU) 15 which is shown in FIG. 4. The arrangement of having the control window 4 displayed in the display position of the cursor 110 enables the user 7 to make the direction of a visual line 60a for taking a sight of the display window 3 approximately coincide with the direction of another visual line 60b for taking a sight of the control window 4. The required amount of shift of a visual line thus can be minimized. The control window 4 can be erased from the screen by pushing another button 6b which is provided on the mouse 6.

While the embodiment is arranged to permit displaying and erasing the control window 4 by operating the mouse 6, the arrangement may be changed to carry out the same control by a key input through the keyboard 8 which is provided as an external input device or by a voice input through the microphone 9.

FIG. 4 is a block diagram showing in outline the arrangement of the embodiment described above. In FIG. 4, the same component elements as those shown in FIG. 2 are indicated by the same reference numerals. Within the computer 100, there are provided a server 12, a window manager 13, a graphic interface 14 and a CPU 15. These parts are connected by a bus 16. The display device 2, the mouse 6 and the keyboard 8 are respectively connected to the server 12 to control communication with them. The window manager 13 is arranged to control each of the windows mentioned above. The graphic interface 14 is connected to the cameras 1 and 10 and is arranged to receive image information from the cameras 1 and 10 and to output the image information. The CPU 15 performs control of varied kinds. In the case of this embodiment, the cameras 1 and 10 are directly connected to the graphic interface 14. The display device 2, the mouse 6 and the keyboard 8 are directly connected to the server 12. However, they may be arranged to be connected respectively through the bus 16 instead of connecting them directly.

The server 12 is arranged to be capable of detecting in which of the windows and in which position within the window the cursor 110 is currently located. The window and the position within the window in which the cursor 110 is currently located thus can be judged according to the result of detection made by the server 12. A necessary action is decided according to the position of the cursor 110 thus judged. This action is then controlled by the CPU 15. In a case where the cursor 110 is located within a window displayed by the display window 3 corresponding to the camera 1, the control window 4 can be displayed over the display window 3 on the screen of the display device 2 as shown in FIG. 3 by pushing the button 6a of the mouse 6.

Figure 5:
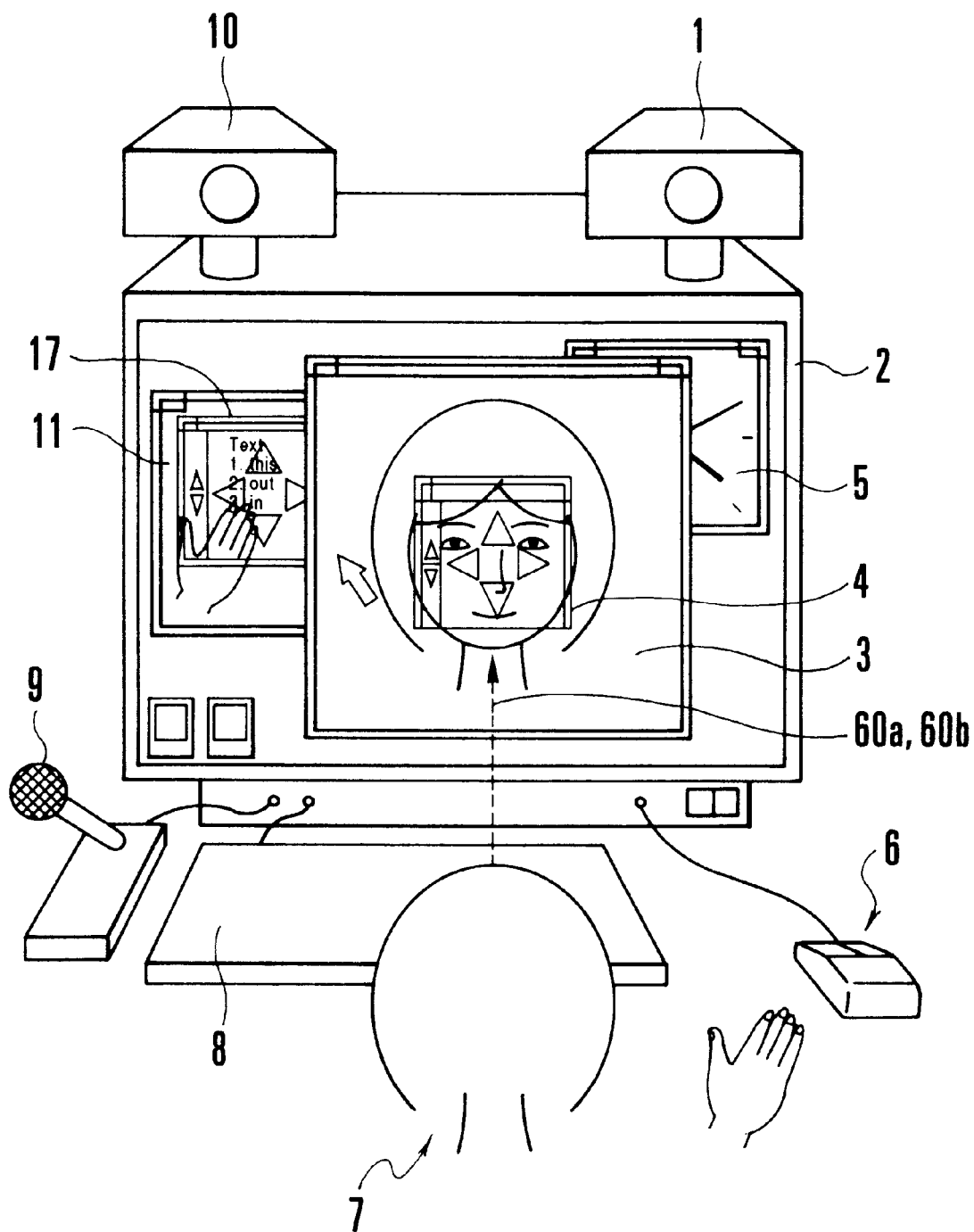
FIG. 5 is a front view showing a state in which a control window is displayed in a semitransparent manner.

Further, when the cursor 110 is located within the display window 11 which corresponds to the camera 10, a control window 17 can be displayed over the display window 11, as shown in FIG. 5, by pushing the button 6a of the mouse 6.

With the system arranged in this manner, in order to minimize the required amount of shift of a visual line, it is preferable to have the control window 4 displayed in the middle part of the display window 3, without designating a position, rather than having the control window 4 displayed in a position indicated by the cursor 110. However, the arrangement of having the display window 3 thus covered with the control window 4 might prevent an adequate operation of the camera 1. This problem can be solved by a modification example which is arranged as shown in FIG. 5. In the case of this example of modification, the control window 4 is arranged to be displayed in a semitransparent state and superimposed on the middle part of the display window 3. This arrangement enables the user to operate the control window 4 while watching the image picked up by the camera 1 with the directions of visual lines 60a and 60b allowed to approximately coincide with each other.

The display window 3 is set to have the highest display priority. When a window having a lower priority, i.e., the control window 4 in this case, is superimposed on the display window 3, the control window 4 which has a lower priority is displayed in a semitransparent state.

According to the arrangement of an ordinary window display system, when a plurality of windows are on display, an arbitrary selected window is disposed foremost in such a way as to cover and hide other windows. When the control window 4 is selected or operated, the display window 3 is overlapped and hidden by the control window 4. With the display window 3 overlapped by another window, this problem can be solved by arranging the overlapping or superimposing window to be displayed in a semitransparent state according to the arrangement mentioned above.

Figure 6:
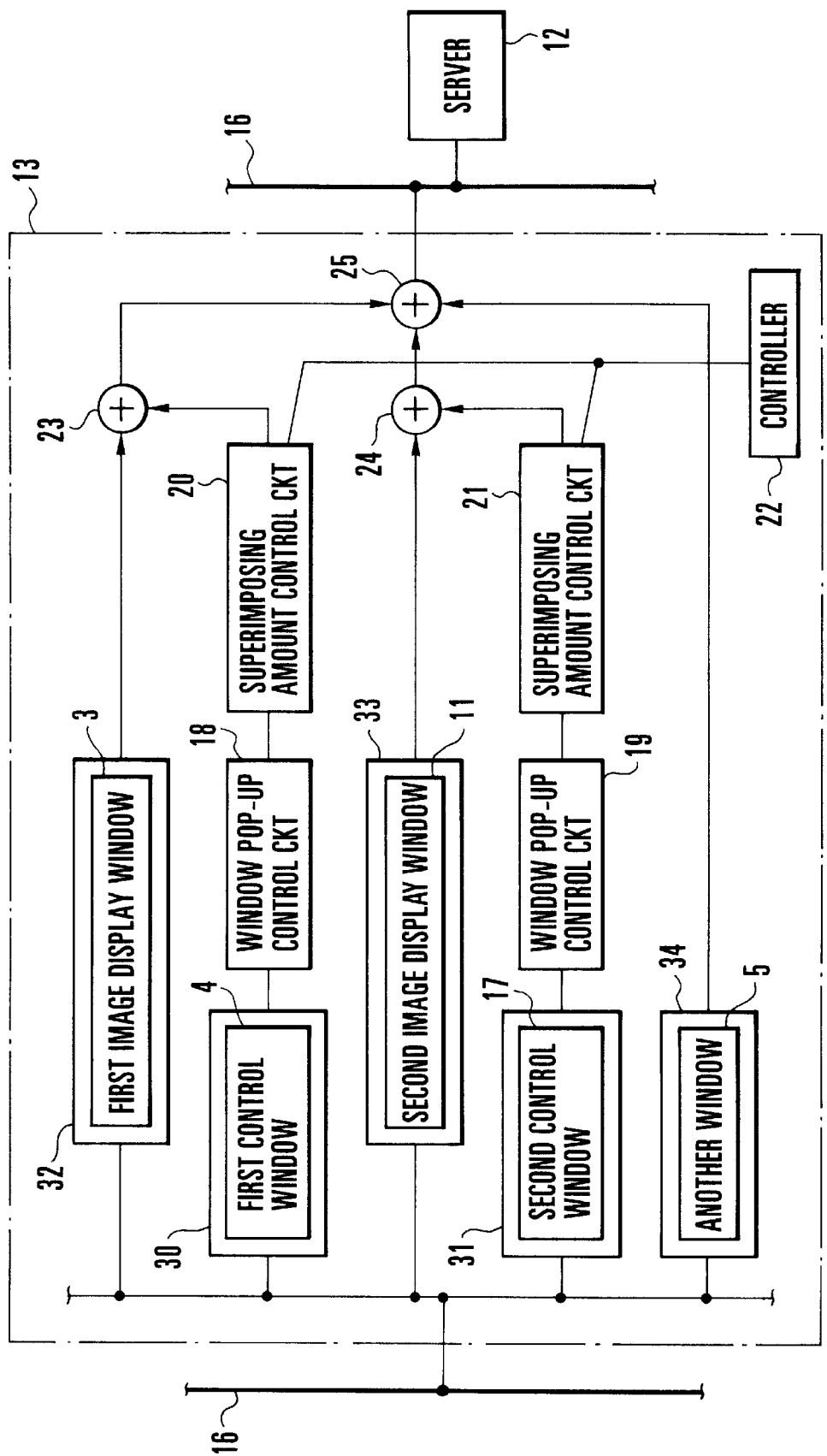
FIG. 6 is a block diagram showing in outline and by way of example the arrangement of a window manager.

The method of control to be carried out in this case is described as follows with reference to FIG. 6. FIG. 6 is a block diagram showing in outline the arrangement of the window manager 13, including a circuit arrangement for displaying the control windows 4 and 17 in a semitransparent state. Referring to FIG. 6, a first window pop-up control circuit 18 (hereinafter referred to as the first pop-up control circuit) controls the appearance and erasure of the first control window 4 which is stored in a memory 30 on and from the first display window 3. A second window pop-up control circuit 19 (hereinafter referred to as the second pop-up control circuit) controls the appearance and erasure of the second control window 17 which is stored in a memory 31 on and from the second display window 11. A first superimposing amount control circuit 20 is arranged to control the amount of superimposing the first control window 4 on the first display window 3 which is outputted through a memory 32. A second superimposing amount control circuit 21 is arranged to control the amount of superimposing the second control window 17 on the second display window 11 which is outputted through a memory 33. A controller 22 controls the first and second superimposing amount control circuits 20 and 21. Further, the data of the first and second control windows 4 and 17 are supplied via the bus 16 from the CPU 15 (see FIG. 4). The data of the first and second display windows 3 and 11 are supplied via the graphic interface 14 and the bus 16 respectively from the cameras 1 and 10 (see FIG. 4).

When the user 7 operates the mouse 6 in a predetermined manner to request for the appearance of the first control window 4 corresponding to the first display window 3 with the first display window 3 having been selected, the first pop-up control circuit 18 sends to a next stage the data of the first control window 4 read out from the memory 30. The data of the first control window 4 thus sent out is inputted to the first superimposing amount control circuit 20. The first superimposing amount control circuit 20 then controls the superimposing amount of the first control window 4 by carrying out a level converting action on the data of the first control window 4. With its superimposing amount controlled, the data of the first control window 4 is supplied to an adder 23 to be added to the data of the first display window 3.

Further, when the user 7 operates the mouse 6 in a predetermined manner to request for the appearance of the second control window 17 corresponding to the second display window 11 with the second display window 11 having been selected, the second pop-up control circuit 19 sends out the data of the second control window 17 read out from the memory 31 to a next stage. The data of the second control window 17 thus sent out is inputted to the second superimposing amount control circuit 21, which controls the superimposing amount of the second control window 17 by carrying out a level converting action on the data of the second control window 17. With its superimposing amount controlled, the data of the second control window 17 is supplied to an adder 24 to be added to the data of the second display window 11.

The data obtained through the addition carried out by the adders 23 and 24 are supplied to a memory 34 to be further added to the data of another window 5. The data thus obtained are supplied to the server 12 through the bus 16. The controller 22 sends a signal for deciding the amount of superimposition to the first superimposing amount control circuit 20 which controls the superimposing amount of the first control window 4. The superimposing amount of the first control window 4 is decided in the following manner. In a case where the second display window 11 is opened and the second control window 17 appears there, the controller 22 sets the superimposing amount of the first control window 4 which corresponds to the first display window 3 at such a value that is larger than that of the second control window 17 and clearly discernible. The superimposing amount of the second control window 17 corresponding to the second display window 11 is then set at such a value that does not hinder an image obtained from the camera 10 and displayed within the second display window 11.

The superimposing amounts are thus controlled by the addition to the data of each of the display windows 3 and 11. However, in order to make constant the levels of images to be finally outputted in the ratio of addition, the levels of the display windows 3 and 11 are controlled as follows. With the level of the final output assumed to be "1" under the control of the signals applied from the controller 22 to the first and second superimposing amount control circuits 20 and 21, the levels of the display windows 3 and 11 are also controlled to make the total of levels of the display and control windows to be "1".

Further, with the total level set at "1", the superimposing amount control circuits 20 and 21 are arranged to add the data of the control windows 4 and 17 to the data of the display windows 3 and 11 within the range of ratios from "0" to "1". If the addition is to be made in the ratio of "0" or "1", the appearance of the display windows and that of the control windows may be switched from one over to the other.

In the case of the embodiment described, the memories 30, 31, 32, 33 and 34 are disposed within the window manager 13. However, these memories may be arranged by separately connecting them to the bus 16. In that case, the data mentioned above are read as necessary into the window manager 13 through the bus 16.

Figure 7:
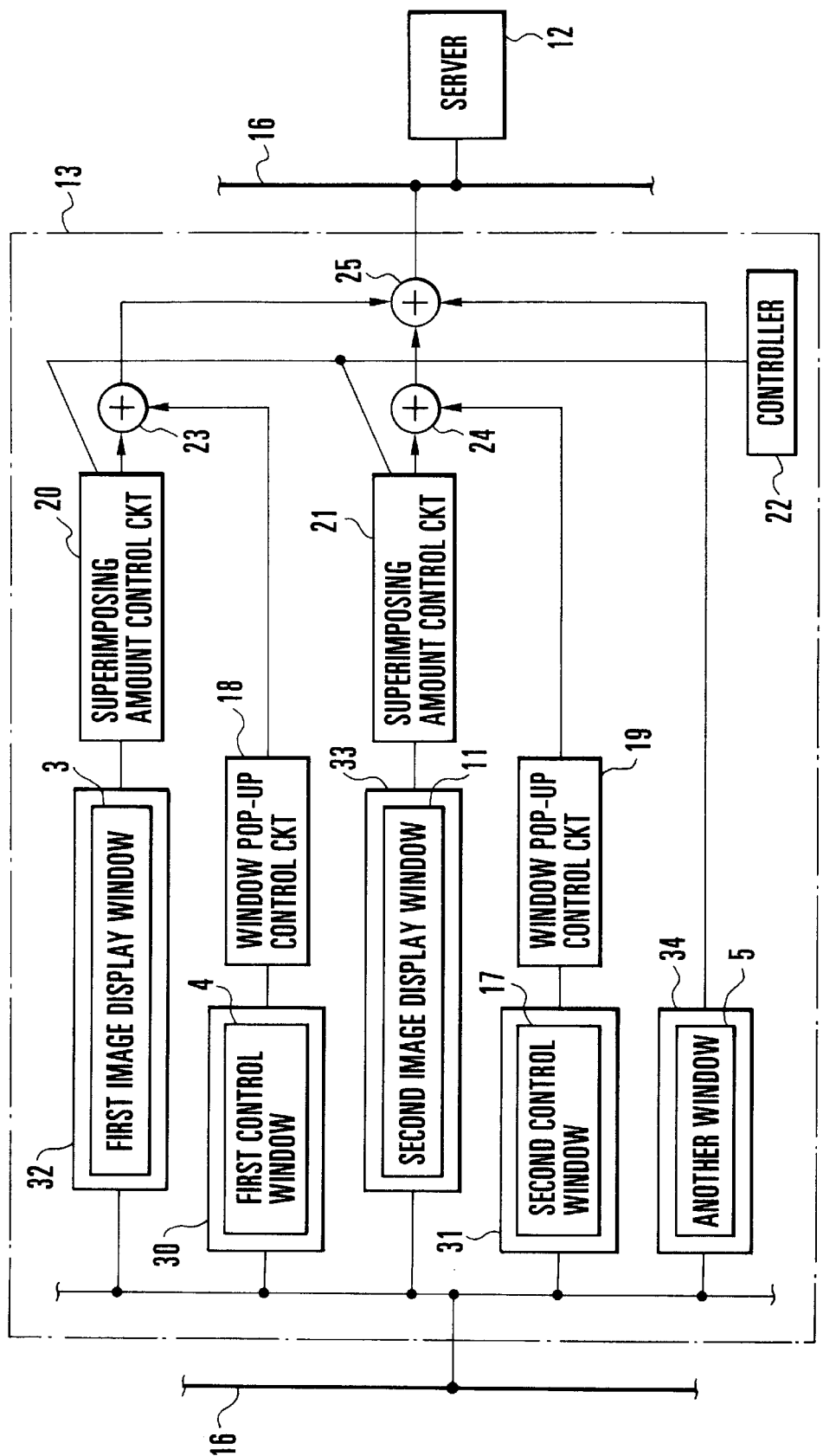
FIG. 7 is a block diagram showing in outline another example of the arrangement of the window manager.

Another method of control is described below with reference to FIG. 7. FIG. 7 shows a case where the window manager 13 is arranged differently from FIG. 6, particularly in respect of the circuit arrangement for semitransparent displays of the control windows 4 and 17. The connecting positions of the superimposing amount control circuits differ from the arrangement shown in FIG. 6. With the exception of this point, the rest of the arrangement of FIG. 7 is identical with that of FIG. 6. In other words, in the case of this modification, the window manager 13 is arranged to superimpose the first and second display windows 3 and 11 (instead of the first and second control windows 4 and 17) and to control the superimposing amounts of them.

With the modification arranged in this manner, when the user 7 operates the mouse 6 or the like in a specific manner to make a request for the appearance of the first control window 4 which corresponds to the first display window 3 with the first display window 3 selected, the first window pop-up control circuit 18 sends out the data of the first control window 4 read out from the memory 30 to a next stage (the adder 23). Meanwhile, the data of the first display window 3 which is outputted through the memory 32 is sent to the first superimposing amount control circuit 20. The first superimposing amount control circuit 20 controls the superimposing amount of the first display window 3 by converting the level of the data of the first display window 3. After the control over its superimposing amount, the data of the first display window 3 is added to the data of the first control window 4 by the adder 23.

Further, if the user 7 operates the mouse 6 in a specific manner to make a request for the appearance of the second control window 17 which corresponds to the second display window 11 with the second display window 11 selected, the second window pop-up control circuit 19 sends out the data of the second control window 17 read out from the memory 31 to the adder 24. Meanwhile, the data of the second display window 11 which is outputted through the memory 33 is sent to the second superimposing amount control circuit 21. The second superimposing amount control circuit 21 controls the superimposing amount of the second display window 11 by converting the level of the data of the second display window 11. After the control over its superimposing amount, the data of the second display window 11 is added to the data of second control window 17 by the adder 24.

The data obtained through the adding operation of the adders 23 and 24 are further added by the adder 25 together with the data of another window 5 read out from the memory 34. The output of the adder 25 is inputted to the server 12.

Figure 8:
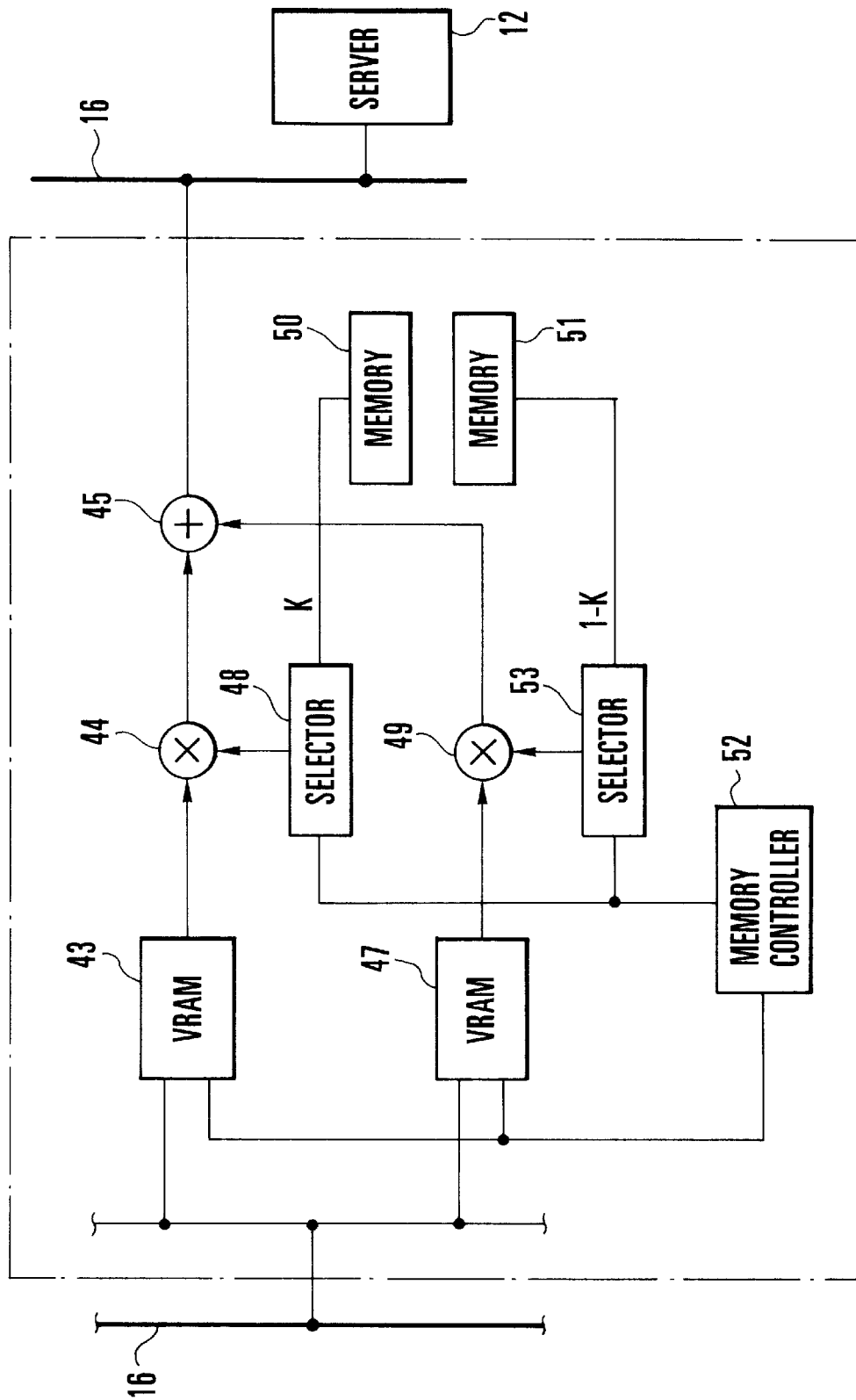
FIG. 8 shows by way of example further details of the arrangement of the window manager.

An example of a more practical arrangement is described with reference to FIG. 8 as follows. FIG. 8 is a block diagram showing by way of example an arrangement for causing the display window 3 and the control window 4 to appear. An example of arrangement for causing the other display window 11 and the other control window 17 to be displayed are omitted from FIG. 8. However, such arrangement can be made also in a manner similar to the arrangement shown in FIG. 8. Data obtained by including such arrangement then can be added and outputted to have a plurality of windows simultaneously opened on the screen of the display device 2 in the same manner as the embodiment shown in FIG. 6 and described in the foregoing.

Referring to FIG. 8, a first video RAM (abbreviated to VRAM) 43 stores image data inputted from a camera 1 which is an external input apparatus. A second VRAM 47 stores data for a display picture such as a control picture or the like formed by the CPU 15 (FIG. 4). Selectors 48 and 53 are arranged respectively to supply the data stored in memories 50 and 51 to integrators 44 and 49 by switching the data from one over to the other.

Each of the memories 50 and 51 stores data for a value "1" and at least a value smaller than "1". A memory controller 52 is arranged to control writing and reading actions on the VRAMs 43 and 47 and to send out signals for switch-over of data to the selectors 48 and 53.

The operation of the embodiment arranged as shown in FIG. 8 is described as follows. The image data stored in the first VRAM 43 and the data of a display picture (a control window) stored in the second VRAM 47 are read out in response to instructions given from the memory controller 52. The data read out from the first VRAM 43 is inputted to the integrator 44. The integrator 44 then controls data level by integrating the data read out from the first VRAM 43 and a predetermined data "K" which is selected by the selector 48 from among a plurality of data stored in the memory 50. More specifically, the data read out from the first VRAM 43 is multiplied by "K" before it is outputted from the integrator 44. In a case where the data K which is obtained from the memory 50 and selected by the selector 48 is equal to "1", the data read out from the first VRAM 43 is outputted from the integrator 44 without any change. In the case of this embodiment, all the data to be selected are arranged to be obtained from the memory 50. However, the above-stated arrangement may be changed to allow the data read out from the first VRAM 43 to pass the integrator 44 as it is, if the value to be used for integration is "1", and to obtain data from the memory 50 only in cases where the value to be used for integration is smaller than "1".

In a case where processes such as a compressing process, a transmission process, etc., are to be performed in addition to the display process, the data stored in the first VRAM 43 is read out by the CPU 15.

The data of the control window which is stored in the second VRAM 47 is, on the other hand, read out by the memory controller 52 and supplied to another integrator 49. Then, the integrator 49 controls the level of data by integrating the data coming from the second VRAM 47 and data which comes from the memory 51 through the selector 53. The data integrated by the integrator 49 is added by an adder 45 to the data integrated by the integrator 44. As a result of the addition, data to be displayed on the display device 2 (FIG. 4) is obtained. Then, with the data which is obtained from the memory 50 assumed to be K, the selector 53 is caused to operate by the memory controller 52 in such a way as to cause the data obtained from the other memory 51 to become (1−K), for the purpose of having the the level of the data to be displayed at "1" as mentioned in the foregoing. To be more specific, the memory 51 is arranged to store data which is (1−K) with respect to the data stored in the memory 50.

The data obtained through the adding action of the adder 45 is supplied to the display device 2 through the bus 16 and the server 12 as described in the foregoing. This arrangement has been described as arranged for one image display window and one control window. However, the same arrangement applies also to a case where two image display windows are to be opened in combination with two corresponding control windows, like the embodiment described in the foregoing, by just arranging two sets of the same arrangements with a required number of adders.

As apparent from the foregoing description, the embodiment permits control over an image input apparatus through a screen, without shifting a visual line, while watching an image which is picked up by the image input apparatus and displayed on the screen.

According to the invention, the control window is arranged to be displayed in a semitransparent state at least in its part overlapping the image display window, so that an image appearing in the image display window can be confirmed even when the control window is opened on the image display window in an overlapping state.

Further, the embodiment of the invention is arranged such that, in a case where at least two image display windows are displayed on a screen together with control windows corresponding to these image display windows, the transparency of each of the control windows is varied in such a manner as to permit discrimination of a camera which is currently under control from another camera which is not currently under control.

What is claimed is:

1. A control device for an image input apparatus, comprising:
   a) display means for displaying, in an image window, image information obtained by an image pickup of an image inputting device, and in a control window not in visual coincidence with said image window, information for permitting control over a predetermined function of said image inputting device;
   b) operator controllable means for variably positioning a cursor on said display means and for receiving operator control input; and
   c) control means for receiving output signals of said operator controllable means and responsive thereto upon preselected disposition of said cursor for displacing said control window into visual coincidence with and on the inner wall of said image window, said control window where said control window coincides with said image window being semitransparently displayed.

2. A device according to claim 1, wherein said control means is arranged to cause said control window to appear approximately in a middle part of said image window.

3. A device according to claim 1 or 2, wherein said control means is further arranged to control at least one of condition of said image input apparatus, including a panning or tilting movement, a focal length, and exposure and a zooming ratio of an optical system.

4. A device according to claim 1 or 2, further comprising a mouse, said mouse being a component of said operator controllable means and said control means.

5. A device according to claim 1 or 2, further comprising a mouse, said mouse being a component of said operator controllable means and said control means.

6. A control device for image input apparatuses, comprising:
   a) display means for displaying image information obtained from a plurality of image input apparatuses respectively in corresponding image windows;
   b) first control means for permitting control over a predetermined function of each of said image input apparatuses through a control window displayed on a screen of said display means;
   c) operator controllable means for variably positioning a cursor on said display means and for receiving operator control input; and
   d) second control means for receiving said operator control input from said operator controllable means and responsive thereto upon preselected disposition of said cursor for displacing said control window into visual coincidence with and on the inner wall of only one of said image windows, said control window where said control window coincides with said one of said image windows being semitransparently displayed.

7. A device according to claim 6, wherein said first control means is arranged to control at least one of conditions of each of said image input apparatuses, including a panning or tilting movement, a focal length, an exposure and a zooming ratio of an optical system.

8. A control device for image input apparatuses, comprising:
   a) display means for displaying image information obtained from a plurality of image input apparatuses respectively in corresponding image windows;
   b) operator controllable means for variably positioning a cursor on said display means and for receiving operator control input;
   c) first control means for permitting control over a predetermined function of each of said image input apparatuses through control windows displayed on a screen of said display means; and
   d) second control means responsive to output signals of said operator controllable means for displacing said control windows into visual coincidence with and on the inner wall of said corresponding image windows and for varying the transparency of each of the control windows, each control window where that control window coincides with the corresponding image window being semitransparently displayed.

9. A device according to claim 8, wherein said first control means is arranged to control at least one of conditions of each of said image input apparatuses, including a panning or tilting movement, a focal length, an exposure and a zooming ratio of an optical system.

10. A device according to claim 9, further comprising a mouse, said mouse being a component of said operator controllable means and said second control means.

11. A display system, comprising:
    a) display means having a display screen;
    b) imaging means for viewing an object and generating output signals indicative of the viewed object;
    c) an imaging means controller for generating output signals indicative of a plurality of controls for said imaging means;
    d) operator controllable means for variably positioning a cursor on said display means and for receiving operator control input; and
    e) control means having
       (1) a first display control unit for display on said display screen of a first visual image corresponding with the viewed object indicated in said imaging means output signals, and
       (2) a second display control unit for display on said display screen of a second visual image corresponding with the plurality of controls for said imaging means indicated in said imaging means controller output signals,
       said control means being responsive to output signals of said operator controllable means for effecting display of said first and second visual images along a common line of sight with respect to said display screen and such that said first visual image is displayed in a first area of said display screen and said second visual image is displaced so as to be displayed in a second area of said display screen, said second area being on the inner wall of and only in said first area, said second visual image being semitransparently displayed.

12. The display system claimed in claim 11, wherein said control means displays said second visual image in superimposition with said first visual image such that said first visual image is visible through the display of said second visual image.

13. A method for image information display using an image input apparatus, comprising the steps of:
 a) displaying, in an image window of a display screen, image information obtained from said image input apparatus and, in a control window not in visual coincidence with said image window, information for permitting control over a predetermined function of said image input apparatus;
 b) displaying a variably positionable cursor on said display screen for control by an operator through a control device; and
 c) upon preselected disposition of said cursor and operator control input to said control device, displacing said control window into visual coincidence with and on the inner wall of said image window, said control window where said control window coincides with said image window being semitransparently displayed.

14. A method for image information display using image input apparatus, comprising the steps of:
 a) displaying image information obtained from a plurality of image input apparatuses respectively in corresponding image windows of a display screen;
 b) permitting control over a predetermined function of each of said image input apparatuses through a control window displayed on said display screen;
 c) displaying a variably positionable cursor on said display screen for control by an operator through a control device; and
 d) upon preselected disposition of said cursor and operator control input to said control device, displacing said control window into visual coincidence with and on the inner wall of only one of said image windows, said control window where said control window coincides with that one of said image windows being semitransparently displayed.

15. A method for image information display using an image input apparatus, comprising the steps of:
 a) displaying image information obtained from a plurality of image input apparatuses respectively in corresponding image windows of a display screen;
 b) displaying a variably positionable cursor on said display screen for control by an operator through a control device;
 c) permitting control over a predetermined function of each of said image input apparatuses through control windows displayed on said display screen; and
 d) upon operator control input, displacing said control windows into visual coincidence with and on the inner wall of said corresponding image windows and varying the transparency of each of the control windows, each control window where that control window coincides with the corresponding image window being semitransparently displayed.

16. A method for object display, comprising the steps of:
 a) viewing an object and generating output signals indicative of a viewed object;
 b) generating output signals indicative of a plurality of controls for an imaging means;
 c) displaying a variably positionable cursor on a display screen for control by an operator through a control device;
 d) displaying on said display screen a first visual image corresponding with the output signals indicative of the viewed object and displaying on said display screen a second visual image corresponding with the plurality of controls for said imaging means indicated in said output signals indicative of a plurality of controls for an imaging means and, responsively to operator input to said control device, effecting display of said first and second visual images along a common line of sight with respect to said display screen, such that said first visual image is displayed in a first area of said display screen and said second visual image is displaced so as to be displayed in a second area of said display screen, said second area being on the inner wall of and only in said first area, and said second visual image being semitransparently displayed.

* * * * *